United States Patent
Hsu

(10) Patent No.: US 6,737,786 B2
(45) Date of Patent: May 18, 2004

(54) WHEEL DRUM STRUCTURE OF INNER STATOR PORTION WITH INBUILT SWITCHES

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 206 days.

(21) Appl. No.: 10/079,482

(22) Filed: Feb. 22, 2002

(65) Prior Publication Data

US 2003/0160537 A1 Aug. 28, 2003

(51) Int. Cl.7 .................................................. H02K 1/12
(52) U.S. Cl. ........................ 310/254; 310/67; 310/156
(58) Field of Search .......................... 310/254, 67, 156, 310/67 R

(56) References Cited

U.S. PATENT DOCUMENTS 6,278,216 B1 * 8/2001 Li .............................. 310/254

\* cited by examiner

Primary Examiner—Dang Le
Assistant Examiner—Iraj A. Mohandei
(74) Attorney, Agent, or Firm—Rosenberg, Klein & Lee

(57) ABSTRACT

The present invention proposes an electromotor or generator having an inner stator portion with stator coils and inbuilt switches. The inner stator portion lets an electromotor or generator have $K_E$ and $K_T$ of different levels in the range of low, middle, or high rotation speed. Variations of $K_E$ and $K_T$ let the electromotor or generator obtain characteristics of uniform and high efficient operation and "low rotation speed and high torsion" and "high rotation speed and high horsepower". A hollow inner hole is formed at an inner stator ring portion end. Two end cover plates at the inner ring portion end cover two end faces of the hollow inner hole. The inner ring portion end forms a hollow space after being covered to dispose the switches. The object of the present invention is to resolve complexity and inconvenience of wiring engineering between stator coils and switches in the electromotor or generator.

18 Claims, 9 Drawing Sheets

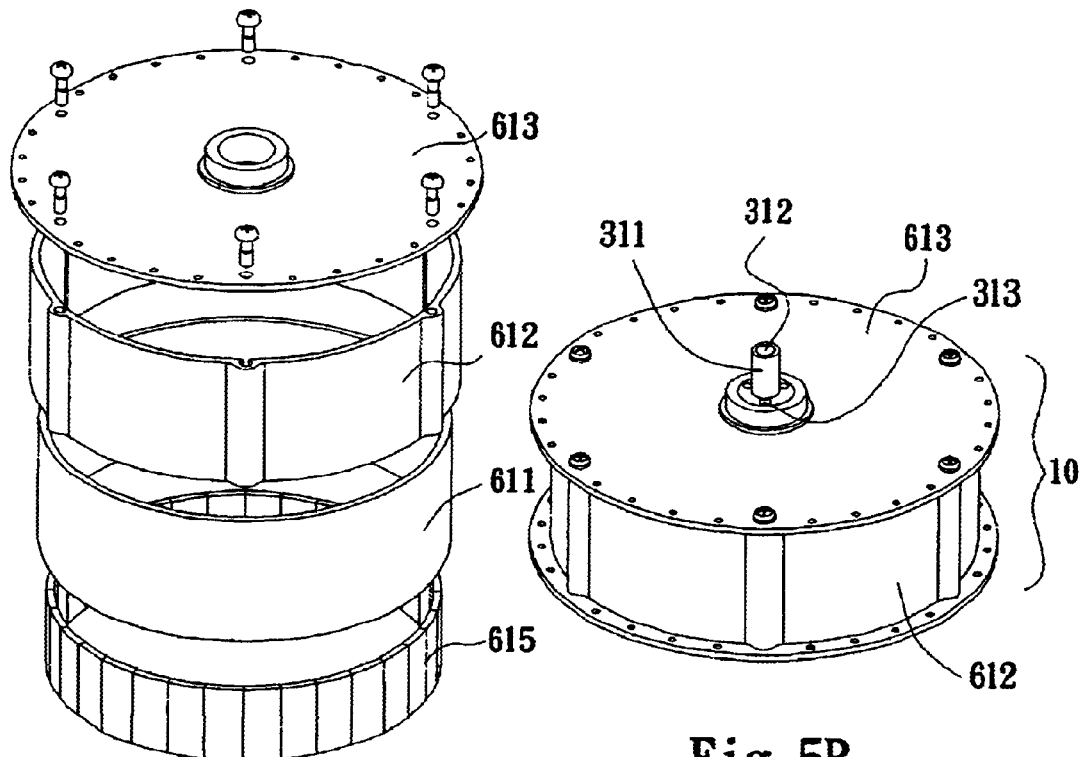
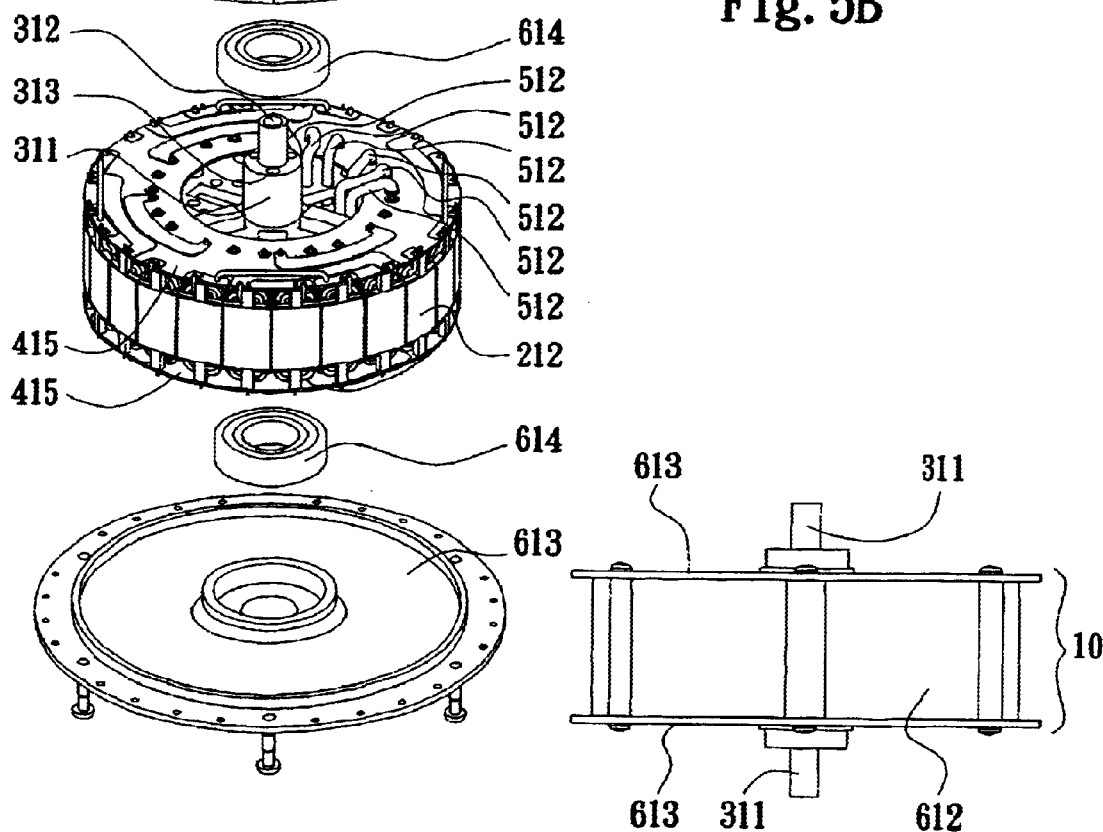
Fig. 5A
Fig. 5B
Fig. 5C

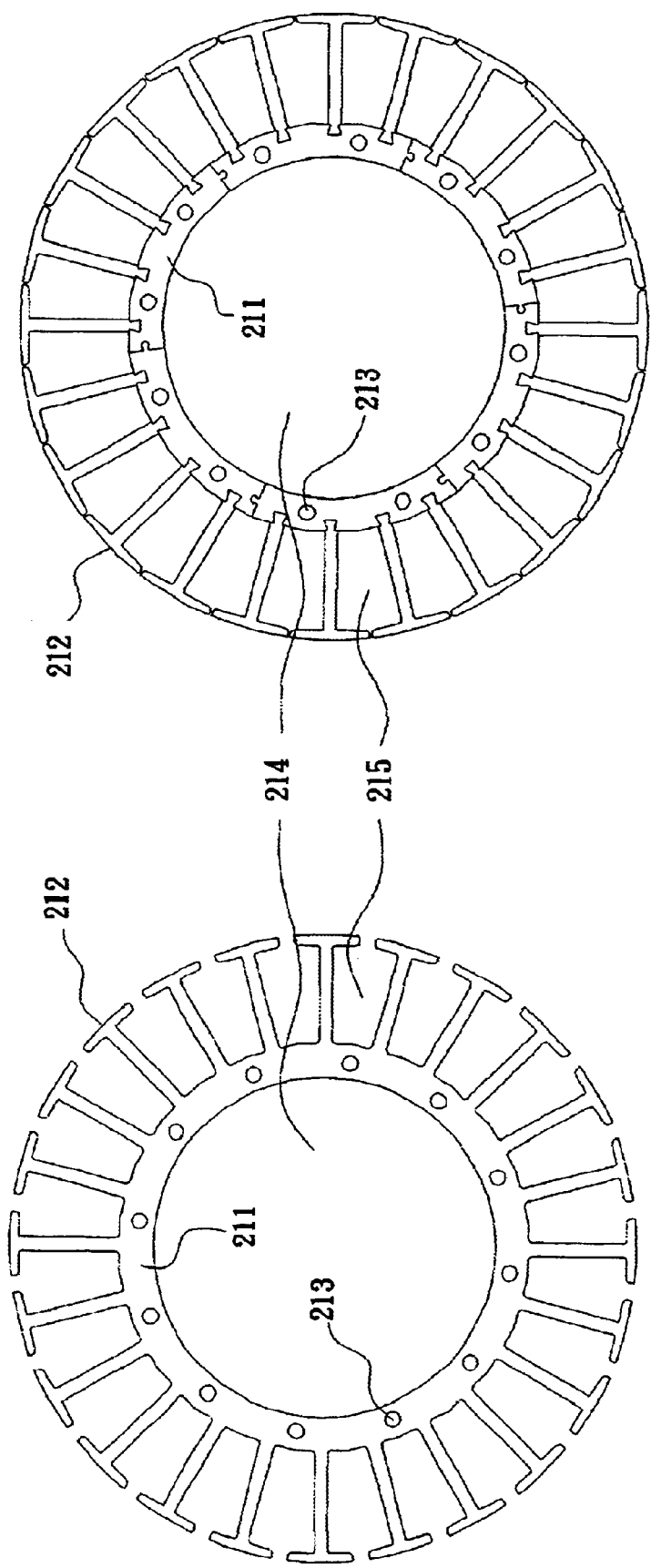

WHEEL DRUM STRUCTURE OF INNER STATOR PORTION WITH INBUILT SWITCHES

FIELD OF THE INVENTION

The present invention relates to a wheel drum structure of an inner stator portion with inbuilt switches and, more particularly, to a wheel drum type electromotor or generator having an inner stator portion with inbuilt switches and a plurality of sets of stator coils.

BACKGROUND OF THE INVENTION

FIG. 1 shows an exploded perspective view of a prior art outer rotor wheel drum type electromotor or generator, whose outer rotor portion 61 comprises a magnet iron yoke ring 611, an outer rotor housing 612, a housing cover plate 613, a bearing 614, and an outer rotor magnet 615. The outer rotor portion 61 has an inner stator 71, wire heads/tails 419 of coils, an axial through hole 312, and an axial through inner hole 315 therein.

In a conventional stator device, a stator portion thereof has a plurality of stator coils, which are switched according to the rotation speed of a rotor to generate the torsion coefficient $K_T$ of various kinds of levels. If the $K_T$ is changed timely, an electromotor can obtain the optimal power performance of "low rotation speed and high torsion" and "high rotation speed and high horsepower". Simultaneously, the plurality of sets of stator coils are switched according to the rotation speed of the outer rotor to generate the counter electromotive force coefficient $K_E$ of various kinds of levels. If the $K_E$ is changed timely, an electromotor or generator can maintain the operational characteristic of high efficiency for all operational regions.

However, wire heads/tails of the plurality of stator coils will increase the count of output wire heads/tails of the electromotor or generator several-fold. Therefore, the wiring operation will be complex and inconvenient. The present invention aims to resolve this problem.

A stator portion of a conventional electromotor or generator is formed by winding a single stator coil. Therefore, the torsion coefficient $K_T$ and the counter electromotive force coefficient $K_E$ thereof are consequentially constant values. This can be illustrated with the following formulas.

$$E = K_E \cdot \Omega \qquad K_E = B \cdot D \cdot L \cdot Z/2$$
$$T = K_T \cdot I_a \qquad K_T = B \cdot D \cdot L \cdot Z/2$$

wherein E is the counter electromotive force voltage (volt), T is the output torsion (N–m), $K_E$ is the counter electromotive force coefficient, $K_T$ is the torsion coefficient, $\Omega$ is the rotation speed of the armature (rad/sec), $I_a$ is the armature current (ampere), B is the magnetic flux density of the air gap (gauss), D is the outer diameter of the armature (cm), L is the superimposed thickness (cm), and Z is the total number of turns of conductors.

As can be seen from the above formulas, the counter electromotive force coefficient $K_E$ equals the torsion coefficient $K_T$, and the values of $K_E$ and $K_T$ are proportional to the total number of turns of conductors Z. Therefore, if the total number of turns of conductors Z of a coil in an identical electromotor or generator changes, the values of the counter electromotive force coefficient $K_E$ and the torsion coefficient $K_T$ vary accordingly.

If an electromotor or generator is to be operated at a high rotation speed with a certain counter electromotive force voltage E, the counter electromotive force coefficient $K_E$ is inevitably lower. Therefore, the output torsion T is necessarily lower. If a larger torsion T is required, it is necessary to increase the armature current $I_a$. However, a too large $I_a$ is not good to the operational efficiency of the electromotor. This can be known from the following formula.

$$P = I^2 \cdot R$$

wherein P is the dissipated power of the coil of the stator portion, I is the armature current, and R is the impedance of the coil. Therefore, if the torsion of an electromotor is increased by increasing the armature current, the dissipated power of the coil of the stator portion will increase squarely, and heat will be generated in the impedance of the coil. The impedance of the coil will correspondingly rise due to the temperature rise of the metallic coil. This vicious circle will let the electromotor or generate operate in an environment of high temperature, hence resulting in a worse output efficiency.

SUMMARY OF THE INVENTION

A stator portion of a conventional electromotor or generator is formed by winding a single stator coil. Therefore, the torsion coefficient $K_T$ and the counter electromotive force coefficient $K_E$ thereof are consequentially constant values. The operational region thereof having better efficiency is much limited. In the present invention, the area of wire grooves of an inner stator portion is deepened and enlarged, and a plurality of sets of coil windings of various turns are disposed therein. A hollow inner hole is formed at an inner ring portion end of the inner stator. Two end cover plates at the inner ring portion end cover two end faces of the hollow inner hole. The inner ring portion end forms a hollow space after being covered to dispose switches therein. Complex wiring operations of the plurality of sets of the stator coils and the switches are thus completed in the structure. By means of systematized management and control, the turns of the inner stator coils can have diversified variations. Variations of the turns of the coils can change the values of the counter electromotive force coefficient $K_E$ and the torsion coefficient $K_T$ of the electromotor or generator. If the values of the $K_E$ and $K_T$ are varied timely, the highest rotation speed of the electromotor will change accordingly, or the highest output voltage of the generator will change accordingly. Therefore, as shown in FIGS. 9A and 9B, because a stator portion has a plurality of values of $K_E$ and $K_T$, the operational region of optimal efficiency generated by each of the values of $K_E$ and $K_T$ can be included in the range of low, middle, or high rotation speed. In other words, the characteristic of high efficiency EFF value can be maintained within a wide range of operational rotation speed. Moreover, if the electromotor needs to work within the range of low rotation speed, a highest value of the torsion coefficient $K_T$ can be obtained once a stator coil of the highest turns is switched to. Contrarily, if the electromotor needs to work within the range of high rotation speed, a lowest value of the counter electromotive force coefficient $K_E$ can be obtained once a stator coil of the least turns is switched to. Therefore, by switching the stator coils of different turns, an electromotor can obtain the optimal power output characteristic of "low rotation speed and high torsion" and "high rotation speed and high horsepower".

An electromotor or generator of the present invention can acquire the operational characteristic of uniform and high efficiency within a wide operational range and the optimal power characteristic of "low rotation speed and high torsion" and "high rotation speed and high horsepower". Moreover, excess space at the ring portion end of the inner stator can be fully exploited. Furthermore, complexity and inconvenience of wiring operations occurring in the prior art can be resolved under the premise that the original volume of a wheel drum type electromotor or generator is not enlarged, hence resolving complexity and inconvenience of wiring engineering.

The various objects and advantages of the present invention will be more readily understood from the following detailed description when read in conjunction with the appended drawing, in which:

BRIEF DESCRIPTION OF THE DRAWINGS

FIG. 5A shows a perspective view of an assembled inner stator portion and an exploded perspective view of an outer rotor portion;

FIG. 5B is a perspective view of an assembled wheel drum according to an embodiment of the present invention;

FIG. 5C is a side view of an assembled wheel drum according to an embodiment of the present invention;

FIG. 6A is a cross-sectional view of an integrally formed inner stator according to an embodiment of the present invention;

FIG. 6B is a cross-sectional view of an assembled inner stator according to an embodiment of the present invention;

DETAILED DESCRIPTION OF THE PREFERRED EMBODIMENTS

Figure 1:
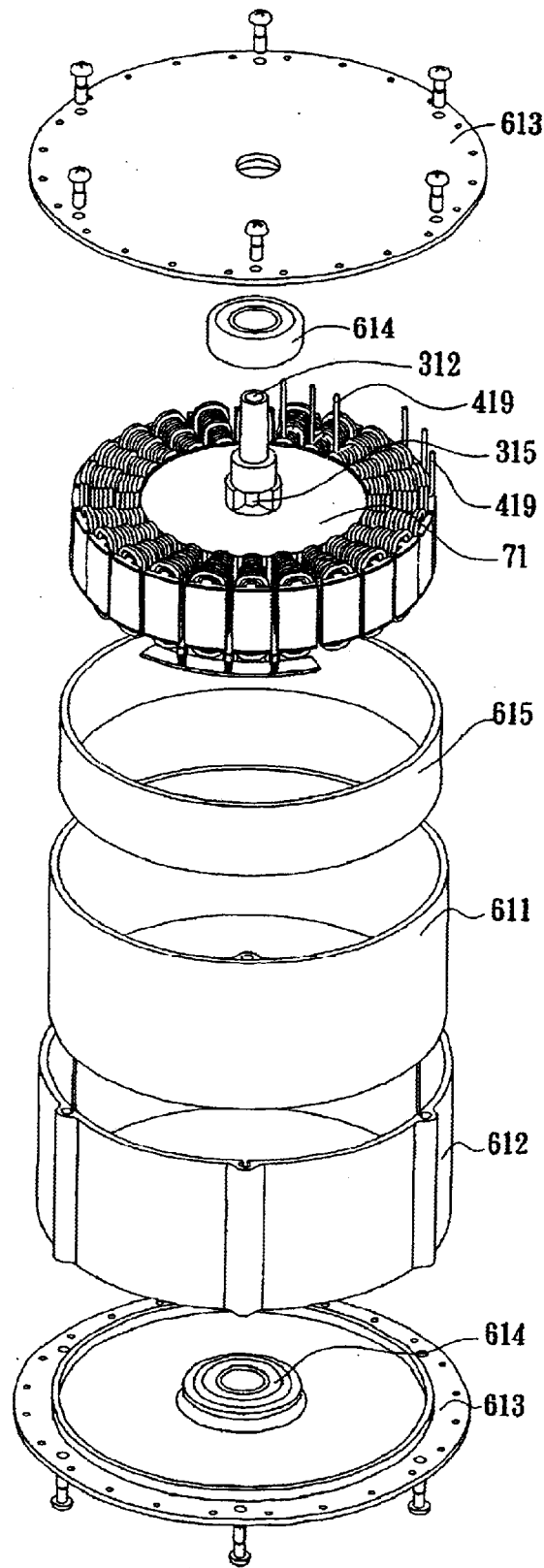
FIG. 1 is an exploded perspective view of a prior art outer rotor wheel drum type electromotor or generator.
Figure 2:
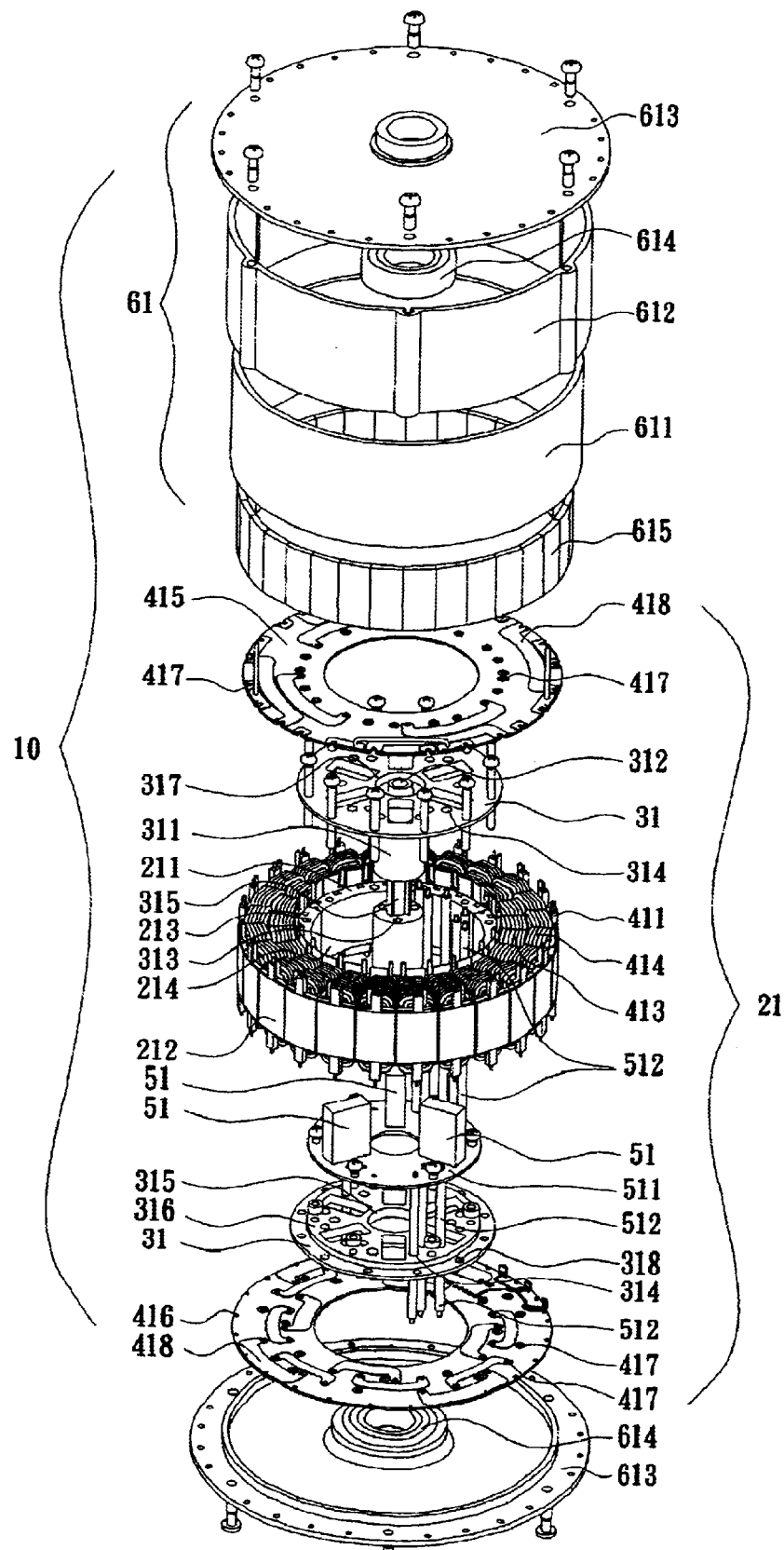
FIG. 2 is an exploded perspective view according to an embodiment of the present invention.
Figure 3:
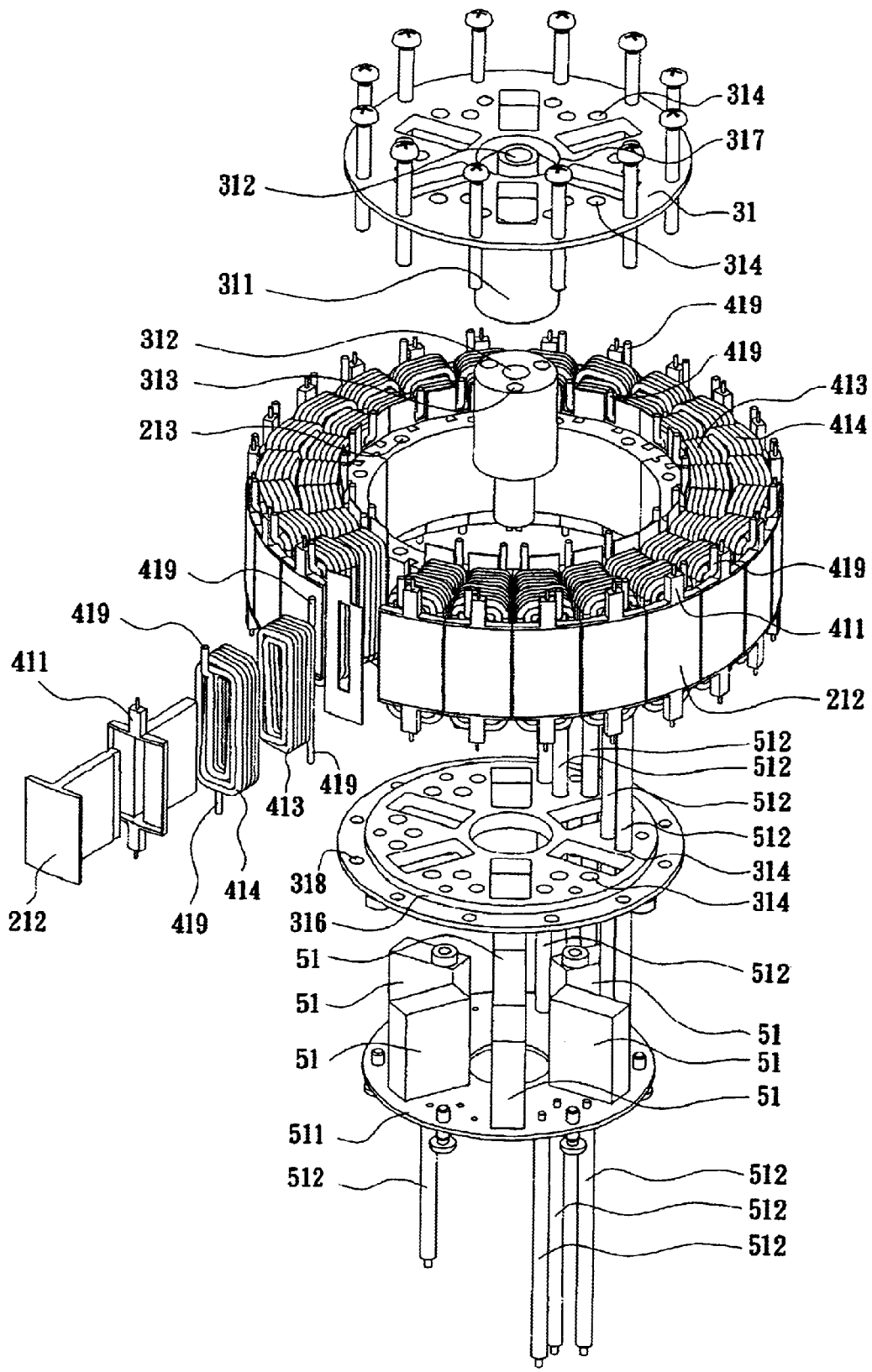
FIG. 3 is an exploded perspective view according to an embodiment of the present invention with switches disposed in a hollow circular space at an inner ring end of a stator portion thereof.
Figure 4A:
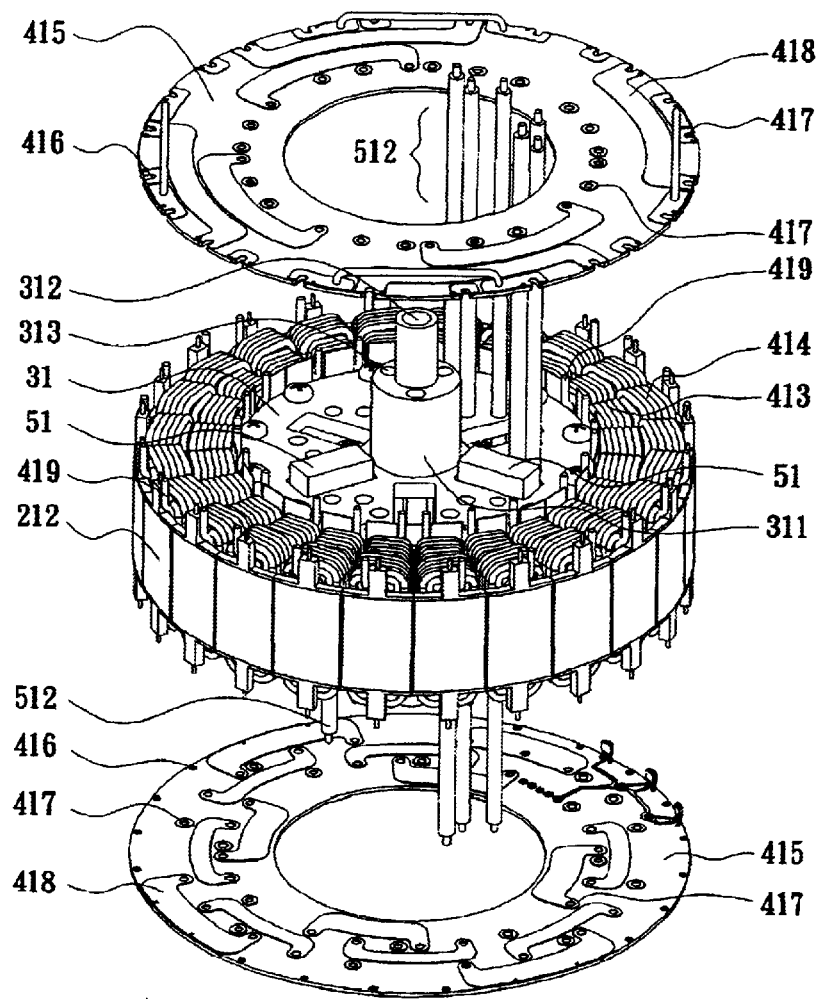
FIG. 4A is an exploded perspective view showing the wiring of switches and a stator coil circuit board according to an embodiment of the present invention.
Figure 4B:
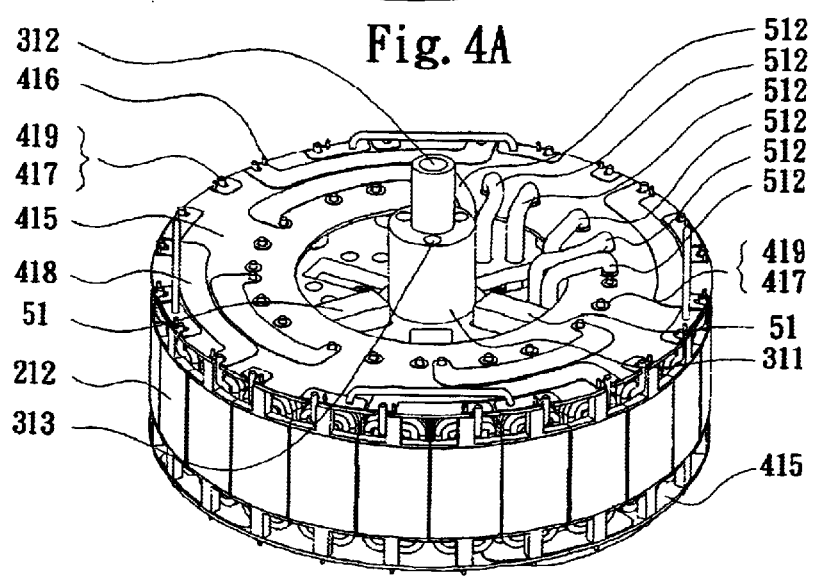
FIG. 4B is a perspective assembly view showing the wiring of switches and a stator coil circuit board according to an embodiment of the present invention.
Figure 7:
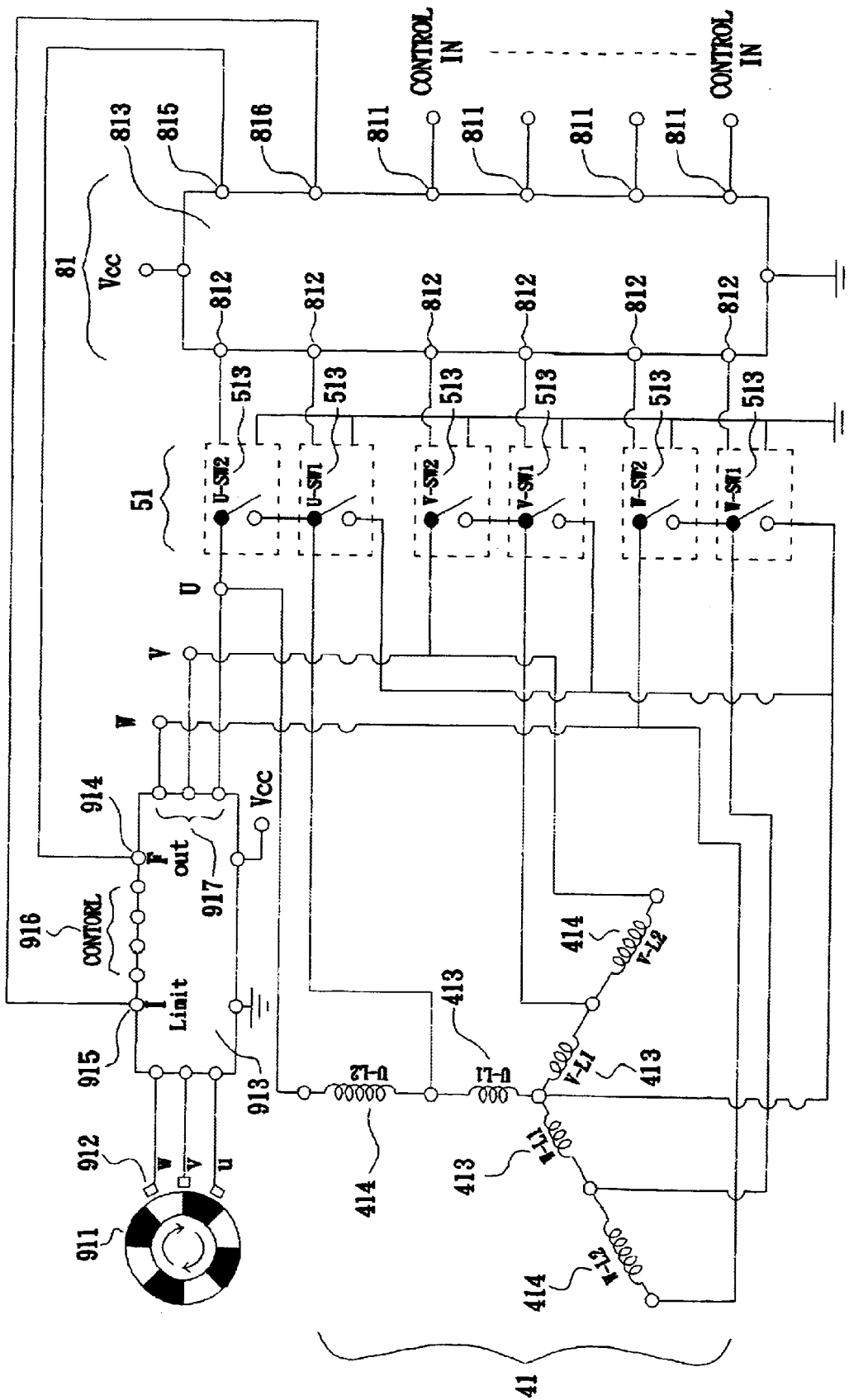
FIGS. 7 and 8 are diagrams showing the circuit wiring according to two embodiments of the present invention.
Figure 8:
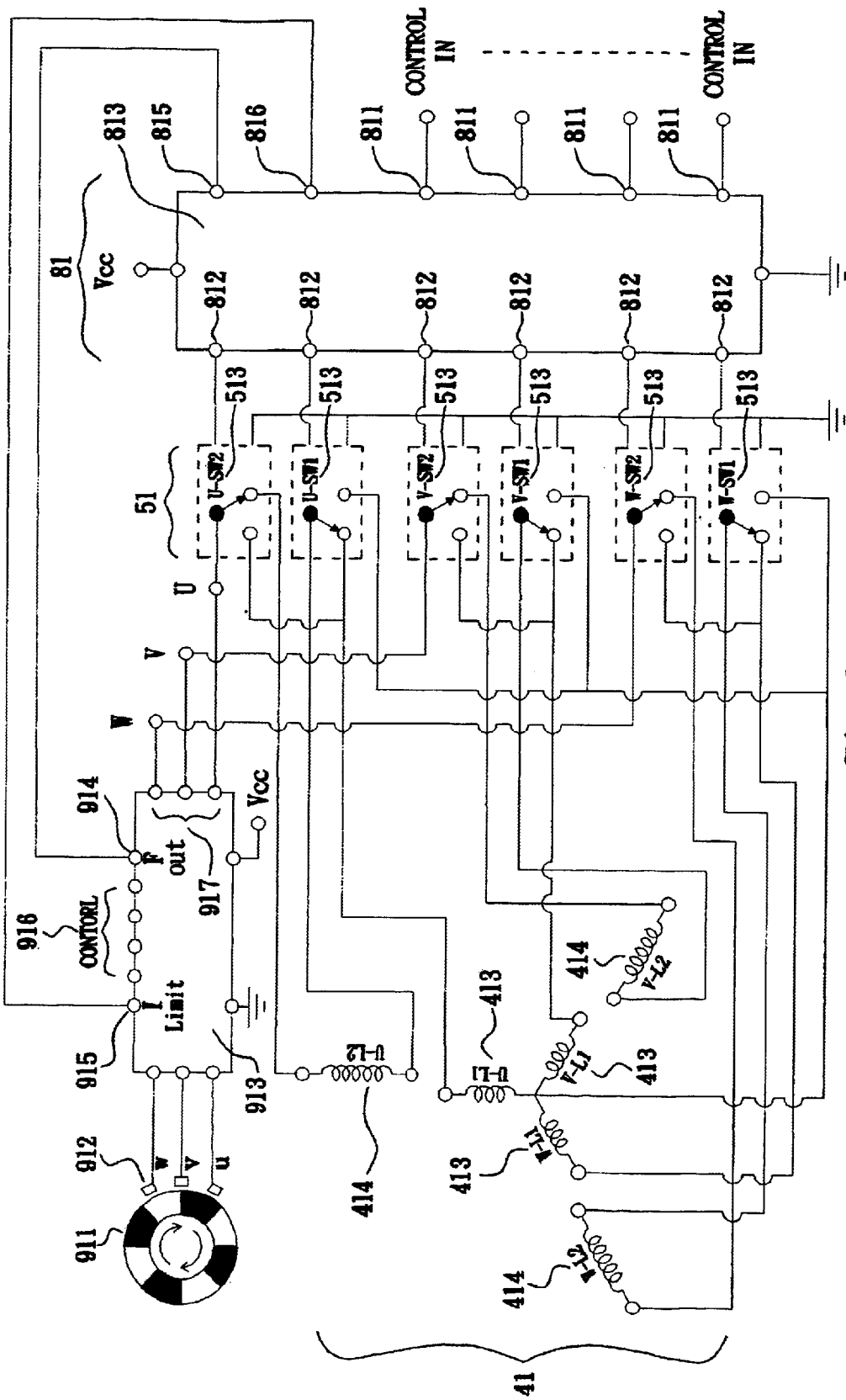
Figure 9A:
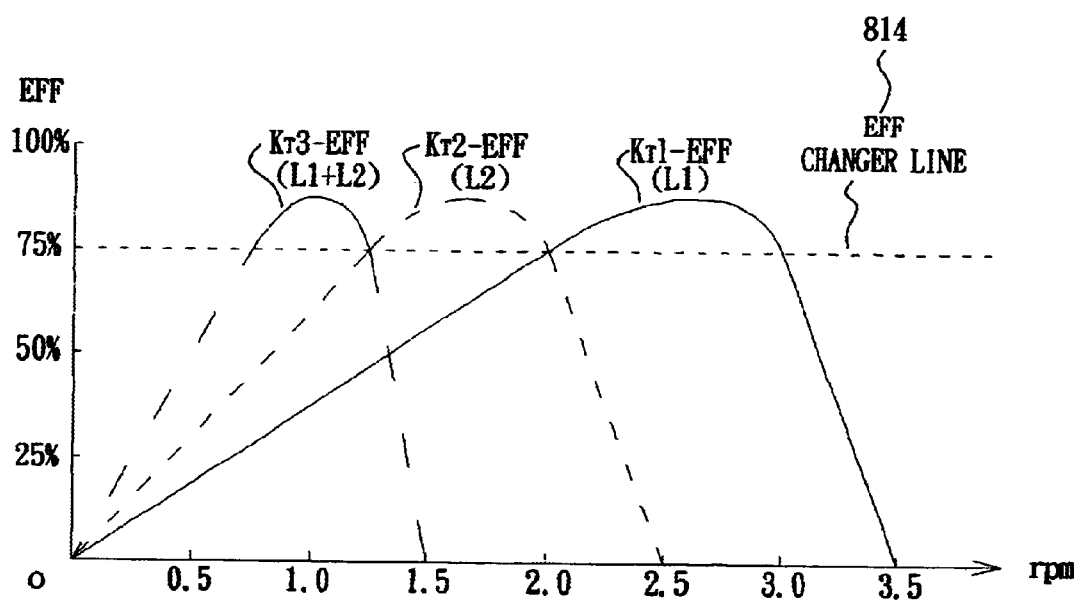
FIG. 9A shows a graph of the operational efficiencies corresponding to three values of the torsion coefficient $K_T$ according to an embodiment of the present invention.
Figure 9B:
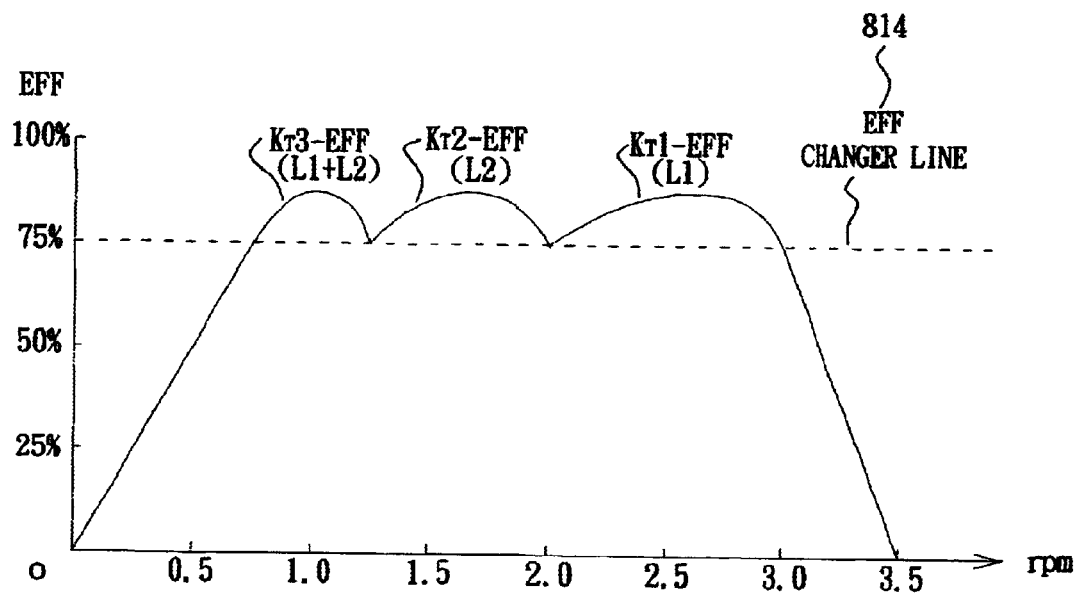
FIG. 9B shows a graph of the operational efficiency obtained after combining the three values of the torsion coefficient $K_T$ according to an embodiment of the present invention.

As shown in FIGS. 2 to 9B, a wheel drum structure of an inner stator with inbuilt switches 10 of the present invention comprises an inner stator portion 21, a stator ring portion end cover plate 31, a plurality of switches 51, a wheel drum supporting shaft 311, and an outer rotor portion 61.

A ring portion end 211 of the inner stator portion 21 forms a hollow space 214. Wire grooves 215 are disposed to receive a plurality of sets of stator coils 41. A plurality of positioning holes 213 are also provided.

The stator ring portion end cover plates 31 cover upper and low end faces of the inner ring portion end 211. The two end cover plates 31 should correspond to a concentric positioning end 317 formed at the same center of the outer rotor portion 61 and the inner stator portion 21. The end cover plate 31 is also provided with a through hole 314.

The plurality of switches 51 are soldered and fixed onto a switch circuit board 511, which should be locked beside the above end cover plates 31.

The wheel drum supporting shaft 311 is pressed and joined in the concentric positioning end 317 of the end cover plates 31. The supporting shaft 311 is provided with at least more than one through holes 312 and 313. Instructions for switching the stator coil windings 41 and the switches 51 are transferred from a control system 81 and a motor drive controller 913 via the through holes 312 and 313. The stator coil windings 41 are also provided with a stator coil circuit board 415, a circuit board positioning hole 416, a stator coil solder hole 417, and a circuit copper foil line 418.

The outer rotor portion 61 includes outer rotor magnets 615 and magnet iron yoke ring 611, and corresponds to the inner stator portion 21 so that an armature can react to rotate and output torque.

The inner stator portion 21 can be formed by separately drawing and stacking the inner ring portion end 211 and a stator tooth end 212. The stator tooth end 211 is then sleeved with a wire groove seat 411 and a plurality of sets of stator coils 413 and 414 and then assembled at the inner ring portion end 211 to form the whole inner stator portion 21.

The stator coils 413 and 414 can be formed by means of separate winding or bending, and are then sleeved with the wire groove seat 411 and the stator tooth end 212 to form an assembly, which is installed at the stator portion inner ring end 211 to form the whole inner stator portion 21.

The stator coils 413 and 414 can be formed by directly winding in the wire groove seat 411, and are then sleeved with the stator tooth end 212 to form an assembly, which is installed at the stator portion inner ring end 211 to form the whole inner stator portion 21.

The inner stator portion 21 can also be formed by integrally drawing and stacking the inner ring portion end 211 and the stator tooth end 212.

The stator coils 413 and 414 of the inner stator portion 21 can be formed by separately winding one groove after another and insulatively disposed in the stator portion wire grooves 215.

The stator coils 413 and 414 of the inner stator portion 21 can also be formed by concentratedly winding across grooves and insulatively disposed in the stator portion wire grooves 215.

The switches 51 can be of mechanical type with contacts. The plurality of sets of stator coils 41 form a stator coil winding network of variable number of turns because of switching of switch contacts 513. The switches 51 are also provided with switch contact connection wires 512.

The switches 51 can also be electronic semiconductor power switches without contacts. The plurality of sets of stator coils 41 form a stator coil winding network of variable number of turns because of switching of power switch contacts 513.

The total number of the switches 51 can be increased or decreased according to the number of turns of the switched stator coils 41.

The stator coil winding network can be designed to be of various kinds of types according to the requirement of operational conditions.

Instructions of switching signal 812 can be changed according to the level of rotation speed detection terminal 914. Instructions of the switching signal 812 will output different switching signals according to the level of the rotation speed detection terminal 914, and let the switch contacts 513 generate different switching actions. The control system 81 further comprises control signal input terminals 811, a management and control system 813, an operational efficiency switch wire 814, a rotation speed detection signal input terminal 815, a current detection signal input terminal 816, an operational tachometer 911, a rotation speed detector 912, an operational current detection terminal 915, and control contacts 916.

Instructions of the switching signal 812 can be changed in manual switching way. Instructions of the switching signal 812 will let the switch contacts 513 generate different switching actions according to manual switching signals.

Flanges 316 are formed at the outer edge ends of the inner stator portion end cover plates corresponding to the inner stator ring portion end 211, and cover the upper and lower end faces of the inner stator ring portion end 211. A plurality of fixing holes 318 are disposed on the end cover plate 31. The end cover plates 31 are joined with the two end faces of the stator ring portion end 211 via the fixing holes 318 so that a hollow space is formed in the inner ring portion.

The switch contacts 513 of the switches 51 are connected to the plurality of sets of stator coils 41, and can form a coil winding network of various kinds of number of turns. The switches 51 are controlled by instruction of the switch system to switch the contacts 513. Switching of the contacts 513 lets the inner stator portion 21 have various kinds of coil winding network of variable number of turns. In other words, the electromotor or generator includes various kinds of variable counter electromotive force coefficients $K_E$ and torsion coefficients $K_T$.

The permanent magnet 615 of the rotor portion 61 can be a tube-shaped magnet adhered on the surface of the magnet iron yoke ring 611 to let the rotor portion 61 correspond to the stator portion 21 so that an armature can react to rotate.

The permanent magnet 615 of the rotor portion 61 can be formed by individually adhering a plurality of permanent magnets on the surface of the magnet iron yoke ring 611 to let the rotor portion 61 correspond to the stator portion 21 so that an armature can react to rotate.

The permanent magnet 615 of the rotor portion 61 can be formed by individually embedding a plurality of permanent magnets into the magnet iron yoke ring 611 to let the rotor portion 61 correspond to the stator portion 21 so that an armature can react to rotate.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A wheel drum structure of an inner stator with inbuilt switches, comprising:
   an inner stator portion with a hollow space formed at an inner ring portion end thereof, said inner stator portion having also wire grooves for receiving a plurality of sets of stator coils;
   two stator ring portion end cover plates covering upper and lower end faces of said inner stator ring portion end, said two end cover plates corresponding to the same center of an outer rotor portion and said inner stator portion to form a concentric positioning end;
   a plurality of switches soldered and fixed on a switch circuit board, said switch circuit board being fixed beside said stator ring portion end cover plates;
   a wheel drum supporting shaft pressed and joined at said concentric positioning end of said end cover plates, said supporting shaft being provided with at least more than one through holes, instructions for switching stator coil windings and said switches being transferred from an external control system via said through holes; and
   an outer rotor portion including outer rotor magnets and a magnet iron yoke ring, said outer rotor portion corresponding to said inner stator portion so that an armature can react to rotate and output torque.

2. The wheel drum structure of an inner stator with inbuilt switches as claimed in claim 1, wherein said inner ring portion end and stator tooth ends of said inner stator portion are formed by separately drawing and stacking, and said stator tooth ends are sleeved with wire groove seats and a plurality of sets of stator coils and then assembled at said inner ring portion end to form said inner stator portion.

3. The wheel drum structure of an inner stator with inbuilt switches as claimed in claim 2, wherein said stator coils are formed by means of separate winding or bending, and are then sleeved with said wire groove seats and said stator tooth ends to form an assembly, which is installed at said stator portion inner ring end to form said inner stator portion.

4. The wheel drum structure of an inner stator with inbuilt switches as claimed in claim 2, wherein said stator coils are directly wound in said wire groove seats, and are then sleeved with said stator tooth end to form an assembly, which is installed at said stator portion inner ring end to form said inner stator portion.

5. The wheel drum structure of an inner stator with inbuilt switches as claimed in claim 1, wherein said inner ring portion end and stator tooth ends of said inner stator portion are integrally formed by drawing and stacking.

6. The wheel drum structure of an inner stator with inbuilt switches as claimed in claim 5, wherein said plurality of sets of stator coils of said inner stator portion are concentratedly wound across grooves and insulatively disposed in said stator portion wire grooves.

7. The wheel drum structure of an inner stator with inbuilt switches as claimed in claim 5, wherein said plurality of sets of stator coils of said inner stator portion are concentratedly wound one groove after another and insulatively disposed in said stator portion wire grooves.

8. The wheel drum structure of an inner stator with inbuilt switches as claimed in claim 1, wherein said switches are of mechanical type with contacts, and said plurality of sets of stator coils form a stator coil winding network of variable number of turns because of switching of said switches with contacts.

9. The wheel drum structure of an inner stator with inbuilt switches as claimed in claim 1, wherein said switches are electronic semiconductor power switches without contacts, and said plurality of sets of stator coils form a stator coil winding network of variable number of turns because of switching of said power switches.

10. The wheel drum structure of an inner stator with inbuilt switches as claimed in claim 1, wherein the total number of said switches can be increased or decreased according to the number of turns formed after said stator coils are switched.

11. The wheel drum structure of an inner stator with inbuilt switches as claimed in claim 1, wherein the stator coil winding network can be designed to be of various kinds of types according to the requirement of operational conditions.

12. The wheel drum structure of an inner stator with inbuilt switches as claimed in claim 1, wherein instructions of switching signal are changed according to the level of rotation speed of motor, and said instructions will output different switching signals according to the level of rotation speed of motor, and let switch contacts generate different switching actions.

13. The wheel drum structure of an inner stator with inbuilt switches as claimed in claim 1, wherein instructions of switching signal are changed in manual switching way, and said instructions will let switch contacts generate different switching actions according to manual switching signals.

14. The wheel drum structure of an inner stator with inbuilt switches as claimed in claim 1, wherein flanges are formed at outer edge ends of said inner stator portion end cover plates corresponding to said inner stator ring portion end, and cover the upper and lower end faces of said inner stator ring portion end, and a plurality of fixing holes are disposed on said end cover plates, and said end cover plates are joined with the two end faces of said stator ring portion end via said fixing holes so that a hollow space is formed in said inner ring portion.

15. The wheel drum structure of an inner stator with inbuilt switches as claimed in claim 1, wherein switch contacts of said switches are connected to said plurality of sets of stator coils, and can form a coil winding network of various kinds of number of turns, and said switches are controlled by instructions of a switch control system to switch said contacts, and switching of said contacts lets said inner stator portion have various kinds of coil winding networks of variable number of turns, i.e., the electromotor or generator includes various kinds of variable counter electromotive force coefficients $K_E$ and torsion coefficients $K_T$.

16. The wheel drum structure of an inner stator with inbuilt switches as claimed in claim 1, wherein a permanent magnet of said rotor portion is a tube-shaped magnet adhered on a surface of said magnet iron yoke ring to let said rotor portion correspond to said stator portion so that an armature can react to rotate.

17. The wheel drum structure of an inner stator with inbuilt switches as claimed in claim 1, wherein a permanent magnet of said rotor portion is formed by individually adhering a plurality of permanent magnets on a surface of said magnet iron yoke ring to let said rotor portion correspond to said stator portion so that an armature can react to rotate.

18. The wheel drum structure of an inner stator with inbuilt switches as claimed in claim 1, wherein a permanent magnet of said rotor portion is formed by individually embedding a plurality of permanent magnets into said magnet iron yoke ring to let said rotor portion correspond to said stator portion so that an armature can react to rotate.

* * * * *